(12) United States Patent
Kashima et al.

(10) Patent No.: US 8,929,431 B2
(45) Date of Patent: Jan. 6, 2015

(54) TRANSCEIVER FOR SERIAL DATA COMMUNICATION UTILIZING PWM ENCODED SIGNAL

(71) Applicant: Denso Corporation, Kariya, Aichi-pref. (JP)

(72) Inventors: Hideki Kashima, Kariya (JP); Tomohisa Kishigami, Obu (JP); Naoji Kaneko, Toyokawa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/954,089

(22) Filed: Jul. 30, 2013

(65) Prior Publication Data

US 2014/0036988 A1 Feb. 6, 2014

(30) Foreign Application Priority Data

Jul. 31, 2012 (JP) ................................. 2012-170188

(51) Int. Cl.
*H03K 7/08* (2006.01)
*H04L 25/49* (2006.01)

(52) U.S. Cl.
CPC ................. *H04L 25/4902* (2013.01)
USPC ........... 375/238; 375/219; 375/279; 455/41.3

(58) Field of Classification Search
USPC .......................................... 375/238, 219, 279
See application file for complete search history.

(56) References Cited

U.S. PATENT DOCUMENTS

| 7,693,229 | B2 * | 4/2010 | Feher | 375/279 |
| 2009/0270037 | A1 * | 10/2009 | Ikeda et al. | 455/41.3 |
| 2012/0314738 | A1 | 12/2012 | Kashima et al. | |
| 2014/0169419 | A1 * | 6/2014 | Kashima et al. | 375/219 |

FOREIGN PATENT DOCUMENTS

| JP | 05-022107 | 1/1993 |
| JP | 10-335993 | 12/1998 |
| JP | 11-154853 | 6/1999 |
| JP | 2008-035071 | 2/2008 |
| JP | 2012-257035 | 12/2012 |

OTHER PUBLICATIONS

Sato, M., "Comprehensive Description of Vehicle-Installation Network Systems", Dec. 1, 2005, pp. 70-77 w/partial English translation.
Office action dated Jun. 3, 2014 in corresponding Japanese Application No. 2012-170188.

* cited by examiner

*Primary Examiner* — Eva Puente
(74) *Attorney, Agent, or Firm* — Harness, Dickey & Pierce, PLC

(57) ABSTRACT

Serial data are transmitted between transceivers via a communication path, each bit expressed by a dominant code or a recessive code which vary between dominant and recessive levels, the dominant code having a greater proportion of duration at the dominant level. A device (clock master) can continuously output successive recessive codes to the communication path, in which condition a transceiver can transmit a dominant code by producing an output drive signal which overwrites a part of a recessive code, currently being received from the communication path, to the dominant level. The output drive signal is shaped with a steeper edge slope at a transition from an inactive to an active level than from the active to the inactive level, enabling an increased data transmission rate without increased noise.

3 Claims, 6 Drawing Sheets

FIG.3
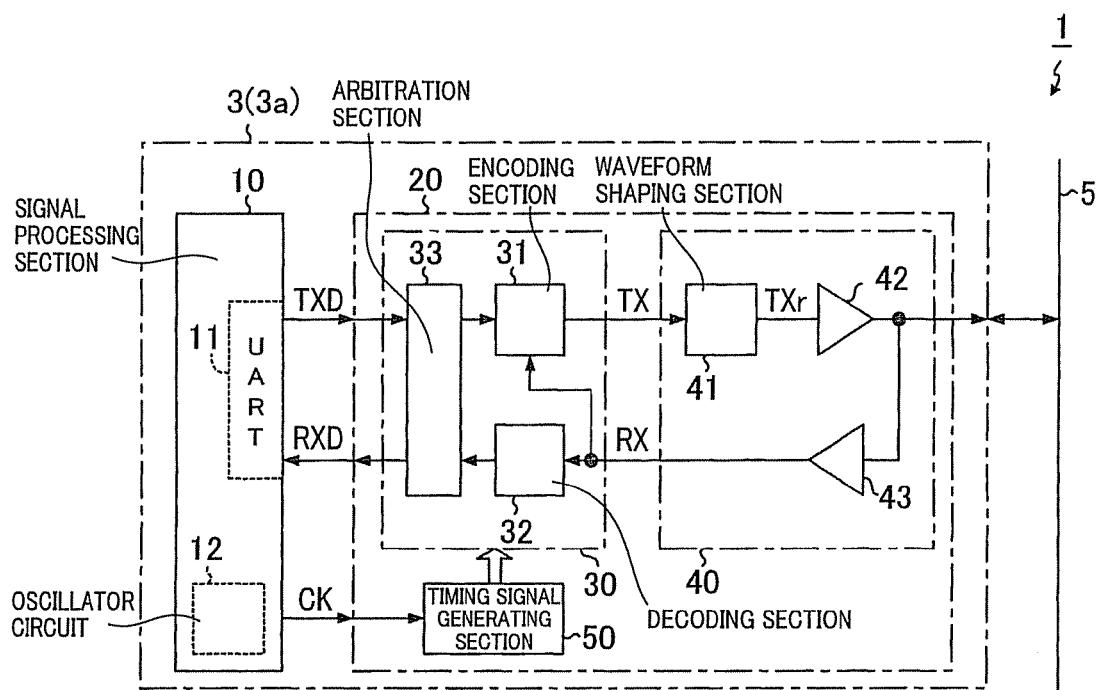
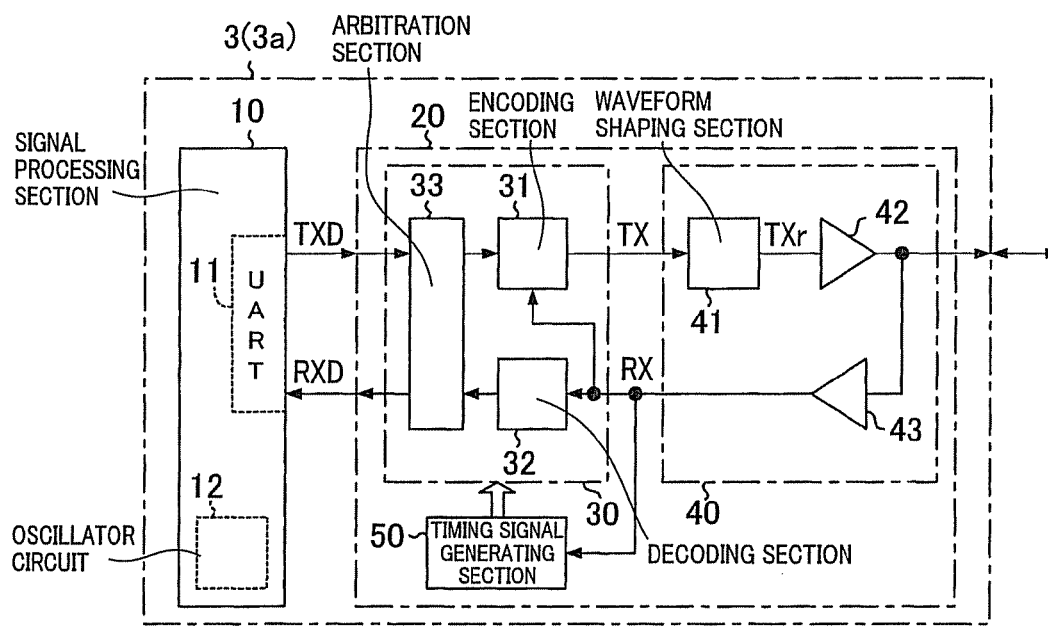

TRANSCEIVER FOR SERIAL DATA COMMUNICATION UTILIZING PWM ENCODED SIGNAL

CROSS-REFERENCE TO RELATED APPLICATIONS

This application is based on and incorporates herein by reference Japanese Patent Application No. 2012-170188 filed on Jul. 31, 2012.

BACKGROUND OF THE INVENTION

1. Field of Application

The present invention relates to a transceiver for use in a communication system in which a transmission code is constituted by a PWM (pulse width modulation) signal.

2. Background Technology

Various types of communication system for installation on a vehicle are known, such as the CAN system, LIN system, etc., which employ a data bus as a communication path. Such systems are described for example in "Comprehensive Description of Vehicle-installation Network Systems" by M. Sato, CQ Publishing Co., (Japan), Dec. 1, 2005.

With such a communication system, to ensure efficient communication, it is desirable to mutually synchronize the operations of transceivers which are located at respective nodes of the system and which transmit/receive signals via the communication path.

One method of achieving such synchronization is as follows. A specific one of the nodes (i.e., the transceiver of that node) transmits a signal to the communication path, which is encoded with a transmission code containing a clock signal component. Each of the other nodes receives that signal via the communication path, extracts the clock signal component, generates a local clock signal (by frequency division, etc.) using the clock signal component as a timing reference, and synchronizes transmission operations with the received clock signal component.

One known type of such a transmission code utilizes PWM signals modulated with two different duty factors, for respectively expressing 1 and 0 bit values. Specifically, each bit is transmitted as a first (binary level) transition, at a bit boundary, followed by an opposite-direction transition. Thus the waveform of the signal expressing the transmission code has edges which occur respectively at a bit boundary and within the bit interval.

To suppress generation of noise on the communication path, each of these edges should have a gradual slope. However in the prior art, to achieve an increased data transmission rate it is necessary for the slope of each the edges to be made more steep, i.e., the steeper the slope, the shorter can become the interval between successive bits. However the steeper the edge slope, the greater will be the amount of noise produced on the communication path. Thus there are conflicting requirements for the edge slope, with respect to achieving a high speed of communication via the communication path while ensuring a low level of noise on the communication path.

In addition, as illustrated in the waveform diagrams of FIG. 7, a problem of unstable operation may arise if, with a specific degree of steepness of the edge slope, the interval between successive edges of the signal waveform expressing the transmission code is made excessively short, so that a signal overlap condition occurs on the communication path.

Thus there is a problem that it is difficult to achieve a satisfactory trade-off between a degree of steepness of edge slope which enables sufficient control of noise and a degree which enables increased communication speed.

SUMMARY

Hence it is desired to overcome the above problem, by providing a transceiver whereby a rate of serial data communication via a communication path of a communication system can be increased without producing a resultant increase in noise on the communication path.

The disclosure provides a transceiver having the following features. The transceiver enables data to be communicated serially by a communication path signal via a communication path, each bit of the data being expressed by pulse code modulation as a dominant code or a recessive code. Each of these codes (as expressed by the communication path signal) changes from a recessive level to a dominant level at a bit boundary, and remains at the dominant level during a fixed interval, with the proportion of a bit interval at the dominant level being longer for the dominant code than for the recessive code. Data are transmitted by the transceiver while another device (clock master) is repetitively outputting the recessive code to the communication path.

When a bit corresponding to the dominant code is to be transmitted, the transceiver generates a shaped transmission signal which changes from an active level to an inactive level at a timing when it is detected that the communication path signal has changed from the recessive level to the dominant level (such a transition of the communication path signal being referred to in the following as a boundary edge) and which subsequently returns to the inactive level after the dominant-level interval of the dominant code has elapsed. The waveform of the shaped transmission signal is formed with sloped edges, and is supplied as an output drive signal to a driver circuit which is configured to hold the communication path at the dominant level while the shaped transmission signal is at the active level, thereby overwriting and replacing the (received) recessive code by the (transmitted) dominant code.

The present invention is characterized in that a waveform shaping circuit forms the shaped transmission signal as follows. In that signal, as illustrated in FIG. 7, each edge which is a transition from the inactive to the active level has a greater degree of steepness than a transition from the active to the inactive level. As a result, the interval between a leading edge and rising edge of the shaped transmission signal can be reduced, to increase the data transmission rate, while ensuring that overlap does not occur between signals appearing on the communication path.

This enables the data transmission rate to be increased without a corresponding increase in noise on the communication path.

BRIEF DESCRIPTION OF THE DRAWINGS

FIG. 3 is a diagram showing the configuration of a node of the communication system;

DESCRIPTION OF PREFERRED EMBODIMENTS

An embodiment of a vehicle-installation communication system utilizing transceivers in accordance with the present invention is described in the following.

General Configuration

Figure 1:
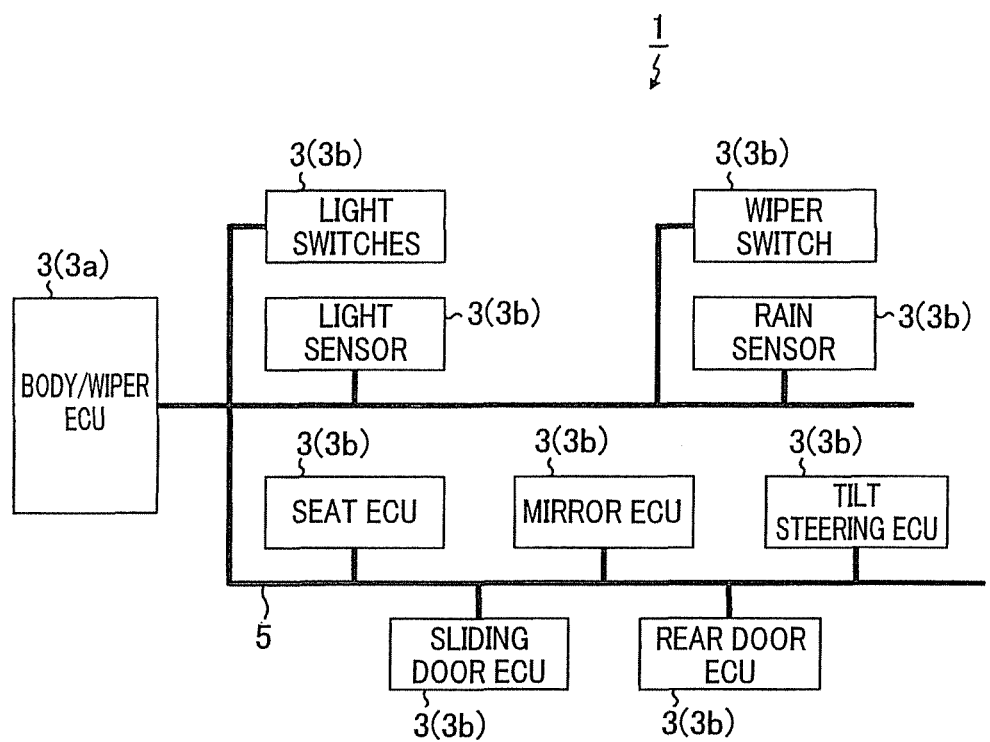
FIG. 1 is a block diagram showing the general configuration of a vehicle-installation communication system.

In the block diagram of FIG. 1, a vehicle-installation communication system is designated by numeral 1. As shown, this is made up of a plurality of nodes, collectively designated by numeral 3, each equipped with a transceiver. The nodes 3 include body system ECUs each of which executes applications (programs stored in a memory), relating to a body system of the host vehicle, and related-equipment nodes incorporating respective devices (lights, sensors, etc.) relating to control and detection functions. The nodes 3 are mutually connected via a data bus serving as a serial data communication path, referred to in the following as the communication path 5.

As shown in FIG. 1, the body system ECUs can include a body/wiper ECU, a seat ECU, a sliding door ECU, mirror ECU, rear door ECU, lights ECU, tilting (power steering position adjustment apparatus) ECU, etc. The related-equipment nodes can include wiper switches, light sensors, rain sensors, etc.

Communication Path

The communication system is configured such that, when two or more of the nodes 3 concurrently output respective signals to the communication path 5, with one or of the signals being at a recessive level (with this embodiment, a high level) and one or more of the signals being outputted at a dominant level (with this embodiment, a low level), the signal appearing on the communication path 5 becomes set to the dominant level. This function is used in applying bus arbitration.

Figure 2A:
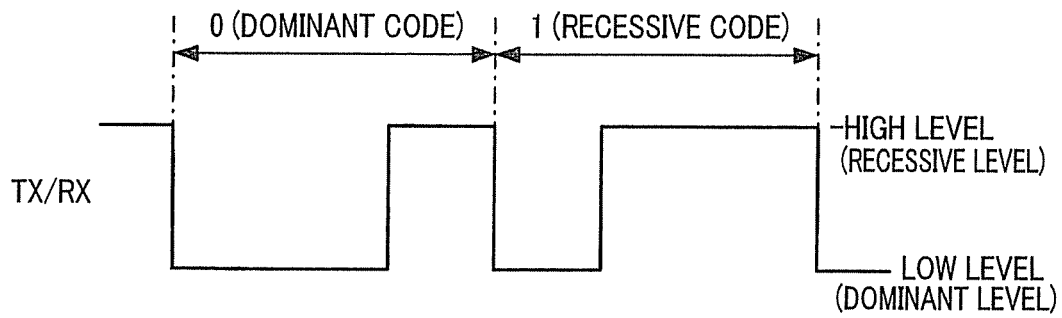
FIG. 2A is a diagram for describing a transmission code used for communication via a transmission path.

FIG. 2A shows the transmission codes used for communication over the communication path 5. Each code is expressed by a PWM (pulse width modulation) signal and has a duration referred to in the following as the bit interval, with the signal level changing from the high to the low level at a bit boundary and changing from the low to the high level within the bit interval. With this embodiment, the low level of communication path signal constitutes a dominant level and the high level constitutes a recessive level. Two types of PWM signal (i.e., having respectively different duty ratios) are utilized as codes for respectively expressing 1-value and 0-value bits. One code, in which the dominant-level proportion is longer than the recessive level proportion is referred to as the dominant code (with this embodiment, corresponding to binary value 0), while the other code, in which the dominant-level proportion is shorter than the recessive level proportion is referred to as the recessive code (corresponding to binary value 1, with the present embodiment).

Specifically with this embodiment, the recessive code remains at the low level during ⅓ of the bit interval and at the high level for the remaining ⅔ of that interval, while the dominant code remains at the low level during ⅔ of the bit interval and at the high level for the remaining ⅓ of the interval. When collision occurs between a dominant code and a recessive code on the communication path 5, the dominant code is selected by the bus arbitration.

An interval in which the recessive code appears on the communication path 5 continuously for longer than a specific number of bits (with this embodiment, 11 bits) is referred to as an IFS (Inter-Frame Space). A state in which the IFS is detected is referred to as the idle state. With the vehicle communication system 1, when the idle state occurs on the communication path 5, each node 3 is able to transmit. After transmission has commenced, each node which detects that it has failed in the bus arbitration immediately halts transmission, and only the node which has been successful in the arbitration continues to transmit, i.e., a type of CSMA/CA (Carrier Sense Multiple Access/Collision Avoidance) control is applied.

Figure 2B:
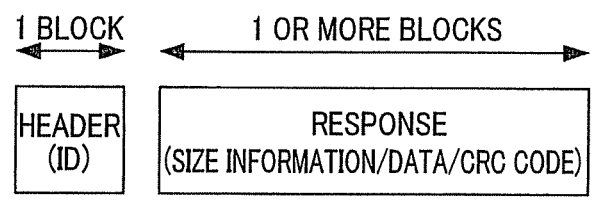
FIG. 2B is a diagram for describing a data frame that is transmitted and received via the transmission path.

As shown in FIG. 2B, a data frame used for communication between respective nodes 3 commences with a header, which specifies whether data conveyed in the frame are permitted to be transmitted, followed by a variable-length response portion containing the data contents which are to be transmitted.

The header contains an ID (identifier) which expresses permission for the data to be transmitted, i.e., whose value indicates whether success is achieved in bus arbitration. In addition to the data contents to be transmitted, the response portion also includes size information specifying the size of the data, and a CRC (Cyclic Redundancy Code) for error checking.

Nodes

One of the nodes 3, designated as the clock master 3a, transmits the aforementioned repetitive recessive codes via the communication path 5 during each IFS to each of the other nodes (designated as the standard nodes 3b), for use as a clock signal to enable clock-synchronized communication. With this embodiment the clock master 3a is the body/wiper ECU. The configuration of the clock master 3a differs only partially from that of a standard node 3b. In the following, the clock master 3a is described only with respect to these points of difference.

As shown in FIG. 3, each node 3 includes a signal processing section 10 and a transceiver 20. The signal processing section 10 executes various processing which is allocated to that node, based on information obtained by communication with other nodes 3 via the communication path 5. The transceiver 20 executes PWM encoding of NRZ-encoded transmission data TXD, supplied from the signal processing section 10, to obtain transmission data TX, and outputs the transmission data TX to the communication path 5. In addition, the transceiver 20 decodes PWM-encoded data RX, received via the communication path 5, to obtain NRZ-encoded received data RXD, which are supplied to the signal processing section 10.

Signal Processing Section

The signal processing section 10 is based on a usual type of microcomputer having a CPU, ROM, RAM, I/O ports, etc., operating in conjunction with a UART (Universal Asynchronous Receiver/Transmitter) 11 employed for asynchronous serial data communication, and an oscillator circuit 12 which generates an operating clock signal for operating the signal processing section 10.

Figure 2C:
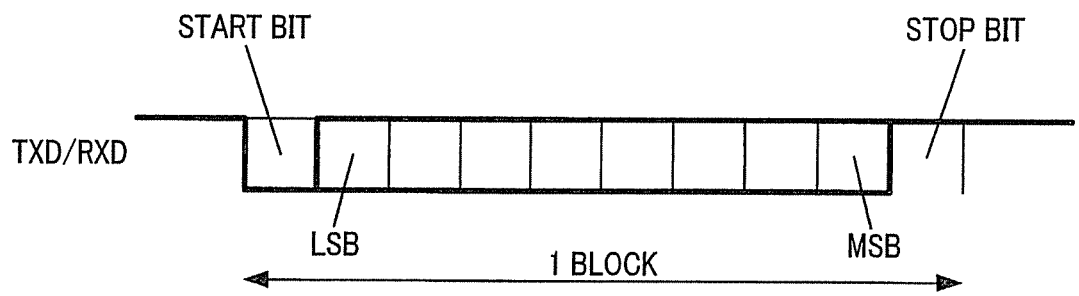
FIG. 2C shows the bits constituting a data block.

Data are transmitted and received by the UART 11 in units of blocks, with the configuration of a data block being as shown in FIG. 2C. The data block commences with a single-bit start bit in which the signal remains at the low level for the duration of a bit interval, and ends with a stop bit (high level), with eight bits of data sandwiched between the stop bit and start bit, making a total of 10 bits. The main portion (8 data bits) begins and ends with an LSB and a MSB respectively.

The data blocks are transmitted and received in units of frames, with the configuration of a data frame being shown in FIG. 2B. The frame commences with a frame header, followed by a response portion, consisting of one or more data blocks. The frame header is a single data block formed of 8 data bits and stop and start bits, with the 8 data bits consisting of 7 ID bits and a parity bit. The first data block of the response portion conveys size information.

As shown in FIG. 3, in the case of the clock master 3a, the oscillator circuit 12 (in addition to generating the operating clock signal as described above) also generates an internal clock signal CK at a frequency (with this embodiment, 20 Kbps) identical to the communication rate of the UART 11, which is supplied to the transceiver 20.

Transceiver

The transceiver 20 is made up of an encoding section 31, a decoding section 32, an arbitration section 33, an analog signal processing section 40, a waveform shaping circuit 41, a transmission buffer 42, a receiving buffer 43 and a timing signal generating section 50. The encoding section 31 encodes the transmission data TXD, and the decoding section 32 decodes the received data RX. The digital processing section 30 includes an arbitration section 33 which detects collisions between data in bit units. The analog signal processing section 40 includes a waveform shaping circuit 41, a transmission buffer 42 and a receiving buffer 43. The waveform shaping circuit 41 performs waveform shaping of the transmission data TX produced from the digital processing section 30, to suppress noise. The transmission buffer 42 serves as a drive circuit which outputs the waveform-shaped transmission data to the communication path 5, and the receiving buffer 43 acquires received data RX from the communication path 5. The timing signal generating section 50 generates various timing signals required for the operation of the digital processing section 30.

Timing Signal Generating Section

The timing signal generating section 50 includes a simple type of oscillator circuit such as a ring oscillator (formed of a plurality of inverters connected in a ring configuration). A clock signal generated by the oscillator circuit is frequency-divided to obtain various timing signals which are synchronized with a reference clock signal. In the case of the clock master 3a, the reference clock signal is the internal clock signal CK, supplied from the signal processing section 10. In the case of each standard node 3b, the reference clock signal is derived from (is synchronized with) the received data RX, i.e., from recessive codes that are repetitively outputted to the communication path 5 from the clock master 3a during each IFS.

Digital Processing Section

Firstly in the case of both a standard node 3b and the clock master 3a, when transmission data TXD expressing a 1-state value are supplied from the signal processing section 10, the encoding section 31 supplies the recessive code as the transmission data TX to the waveform shaping circuit 41. When transmission data TXD expressing a 0-state value are supplied, the encoding section 31 supplies the dominant code as the transmission data TX.

However in the digital processing section 30, the operation of the encoding section 31 of a standard node 3b differs from that of the clock master 3a as follows. The encoding section 31 of the clock master 3a is configured such that, so long as no transmission data TXD are being supplied from the signal processing section 10, i.e., during each IFS, the encoding section 31 repetitively produces the recessive code (corresponding to a 1-state bit) as the transmission data TX. The successive recessive codes are thereby continuously supplied via the communication path 5 to each of the standard nodes 3b for use as a clock timing reference signal, during each IFS.

Figure 4:
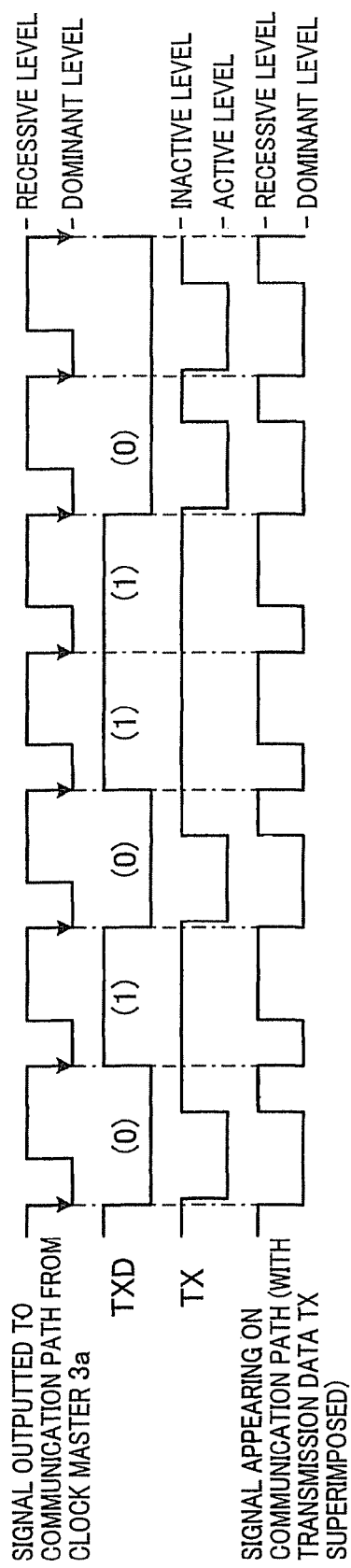
FIG. 4 is a timing diagram of the operation of an encoding circuit.

The timing diagram of FIG. 4 illustrates signal relationships when encoded data are transmitted by a standard node 3b during an IFS. The encoder 31 of the transceiver 20 obtains the transmission data TX, supplied to the waveform shaping circuit 41, by encoding the transmission data TXD to NRZ (Non-Return to Zero) code.

As shown, when the transmission data TXD expresses a 1-state bit, the data TX is set at the inactive level for the duration of the corresponding bit interval. When the data TXD expresses a 0-state bit, the transmission data TX goes to the active level at the timing when the next falling edge of the received data RX is detected, and returns to the inactive level after a predetermined duration (prior to the end of the corresponding bit interval).

Figure 6:
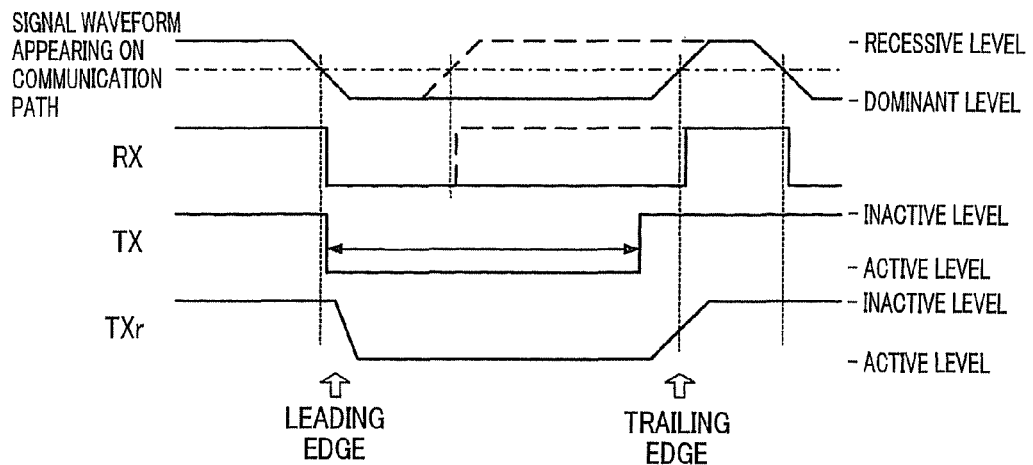
FIG. 6 is a timing diagram illustrating the operation of the analog processing section.

The lowest timing diagram in FIG. 4 shows the resultant signal which appears on the communication path 5 when the transmitted bit sequence is 0, 1, 0, 1, 1, 0, 0. As indicated, in each bit interval corresponding to a 1-state bit the recessive code outputted from the clock master 3a is transmitted unchanged on the communication path. In each bit interval corresponding to a 0-state bit, the transmission data TX (dominant code) overwrites a recessive code that is currently beginning to appear on the communication path 5 (outputted from the clock master 3a) by the dominant code, i.e., the recessive code becomes replaced by the dominant code. More specifically, as illustrated in FIG. 6, this overwriting commences at completion (or immediately following completion) of the leading edge of the received recessive code.

Returning to FIG. 3, the decoding section 32 of the transceiver 20 decodes the received data RX (PWM-encoded data) acquired by the receiving buffer 43, to NRZ encoded form. The resultant decoded received data RXD are supplied to the signal processing section 10. Measuring from each boundary edge as a starting point, the decoding section 32 obtains the duration for which the dominant level is continued, until a transition to the recessive level occurs. If the measured duration exceeds a predetermined threshold value a 0-value bit (dominant code) is judged to be received, while otherwise, a 1-value bit (recessive code) is judged to be received.

The arbitration section 33 compares the transmission data TXD with the received data RXD in units of bits, and halts the supplying of the transmission data TXD to the encoding section 31 if the respective signal levels do not match.

Analog Processing Section

Figure 5:
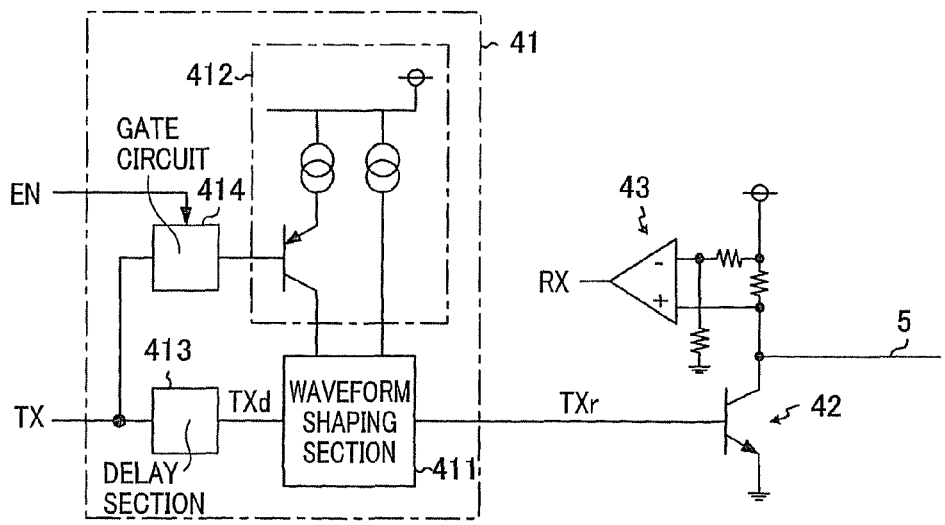
FIG. 5 is block diagram incorporating a circuit diagram showing the configuration of an analog processing section.

FIG. 5 shows the configuration of the transmission buffer 42 and receiving buffer 43 of each of the nodes 3, and the waveform shaping circuit 41 of a standard node 3b. The transmission buffer 42 utilizes a transistor connected in an open-collector circuit to the communication path 5, for enabling bus arbitration. The receiving buffer 43 of the analog signal processing section 40 is based on a comparator, which outputs the received signal RX at a high level when the signal level appearing on the communication path 5 is above a predetermined threshold value and otherwise outputs the signal RX at a low level.

Also as shown in FIG. 5, the waveform shaping circuit 41 includes a waveform shaping section 411, a current switching section 412, a delay circuit 413 and a gate circuit 414. The operation of the waveform shaping circuit 41 will be described referring to the timing diagrams of FIG. 6. The delay circuit 413 serves to delay the transmission data TX supplied from the encoding section 31, outputting delayed transmission data TXd. The waveform shaping section 411 performs a similar function to a low-pass filter, shaping the waveform of the signal expressing the delayed transmission data TXd to have appropriate sloping edges, with the resultant signal being designated as the shaped signal TXr, which is connected to the transmission buffer 42 to serve as an output drive signal. The waveform shaping section 411 is controlled in accordance with a level of (DC) drive current supplied thereto. Specifically, while a relatively high value of drive current is being supplied, the slope of an edge of the shaped signal TXr is made more steep than when a relatively low value of drive current is being supplied.

In the case of a standard node 3b, the current switching section 412 performs changeover of the level of drive current supplied to the waveform shaping section 411 in accordance with the signal level of the transmission data TX from the encoding section 31. This is executed such that the drive current supplied to the waveform shaping section 411 will be higher when the transmission data TX is at the active level than when it is at the inactive level.

When an enable signal EN is held at an active level (as is the case for a standard node 3b), the gate circuit 414 supplies the transmission data TX to the current switching section 412, for controlling changeover of the drive current supplied to the waveform shaping section 411. In the case of the bus master 3a, the enable signal EN is held at an inactive level, causing the gate circuit 414 to fixedly supply a signal at the inactive level of the transmission data TX, to control the current switching section 412.

The delay circuit 413 serves to ensure that the current switching section 412 of a standard node 3b changes over to an appropriate state (high current or low current supply state) prior to each edge timing of the delayed transmission data TXd.

In the case of the clock master 3a, the enable signal EN is fixed such that the low value of drive current is supplied continuously from the current switching section 412 to the waveform shaping section 411. As a result, the waveform shaping circuit 41 of the clock master 3a forms the shaped signal TXr with each leading edge and trailing edge have a similar degree of slope steepness.

In the case of a standard node 3b, the edges of the shaped signal TXr are formed as follows, referring to FIG. 6. When a falling edge of the received signal RX occurs, the transmission data TX from the encoding section 31 changes from the inactive level to the active level. The control signal supplied to the current switching section 412 from the gate circuit 414 thereby immediately goes to the active level. Since the level of drive current supplied to the waveform shaping section 411 is thereby increased, this results in a leading edge of the shaped signal TXr being formed with a relatively steep slope, as shown in FIG. 6.

Thereafter, when a rising edge (trailing edge) of the transmission data TX occurs (i.e., the signal supplied to the current switching section 412 via the gate circuit 414 as a switching control signal goes to the inactive level), the level of drive current supplied to the waveform shaping section 411 from the current switching section 412 becomes low. As a result, the corresponding rising edge (trailing edge) of the shaped signal TXr is formed with a slope having a smaller degree of steepness than the leading edge.

In the case of the clock master 3a, each rising edge and falling edge of the shaped signal TXr is formed with a slope having a degree of steepness similar to that of a trailing edge of the signal TXr of a standard node 3b, as shown in FIG. 6.

For ease of understanding, the variation of the shaped signal TXr is shown in FIG. 6 as being matched in polarity to the variation of the signal appearing on the communication path 5. However as can be understood from the diagram of the output circuit 42 (FIG. 5), the polarity variation of TXr is inverted from that shown in FIG. 6. That is, the signal appearing on the communication path 5 is pulled down to the dominant level when a transceiver 20 generates the shaped signal TXr at the active (high) level.

Effects

With the vehicle communication system 1 described above, the waveform of the shaped signal TXr (expressing transmission data TX) produced by a transceiver 20 of a standard node 3b is formed, by the waveform shaping section 411 of the transceiver 20, such that each leading edge and trailing edge has a gradual slope. However in particular, each leading edge is formed with a more steep slope than each trailing edge. The shaped signal TXr, drives the transmission buffer 42 of the transceiver 20 such that when the shaped signal TXr expresses a dominant code, that code becomes superimposed on a recessive code which is currently being outputted to the communication path 5 from another transceiver (the clock master 3a).

Figure 7:
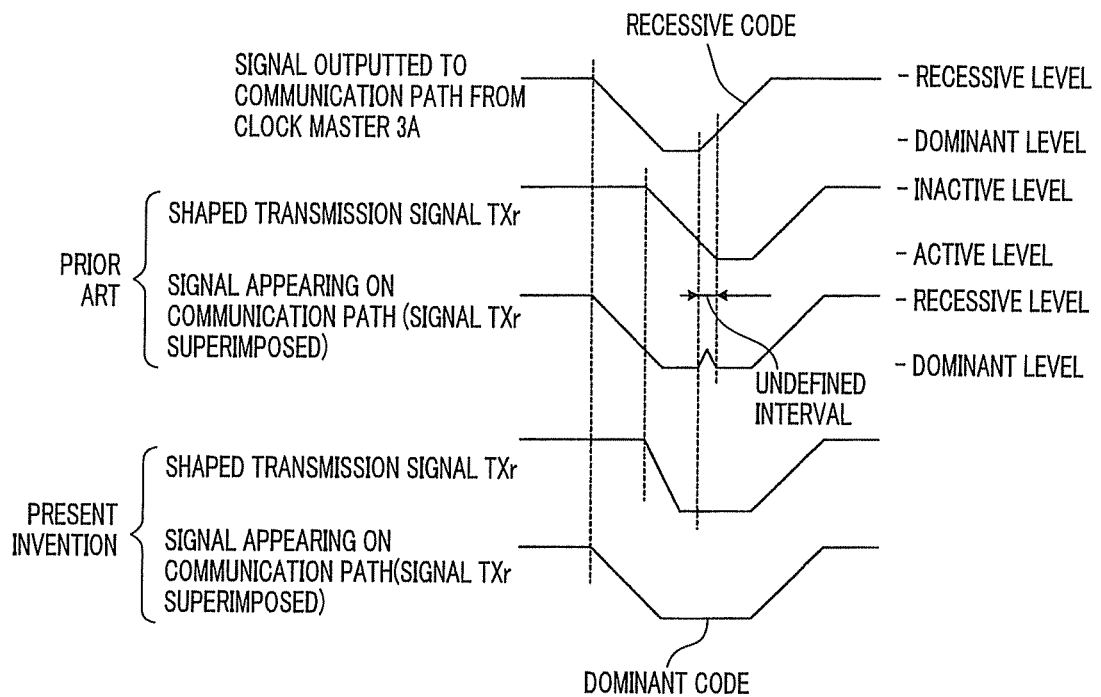
FIG. 7 is a waveform diagram for describing a problem of the prior art and an effect of the present invention.

The advantages of this are as follows. With a standard node 3b, As illustrated in FIG. 6, the leading edge of a dominant code expressed by the shaped signal TXr occurs in response to a boundary edge of the signal appearing on the communication path 5, as when a recessive code is outputted from the clock master 3a. The signal TXr thereafter remains at the dominant level during a specific interval. The more gradual the degree of slope of the edges of signal TXr, the shorter becomes the duration of that interval. As illustrated in FIG. 7, if that interval is excessively short, overlap will occur between the leading edge of signal TXr and a trailing edge of the signal outputted from the clock master 3a. As a result, an undefined interval will occur, resulting in noise (ringing) being produced on the communication path 5. This sets a limit to the maximum rate at which data can be communicated.

With the present invention, the slope of the leading edge of the shaped signal TXr is made more steep than the trailing edge. However the slope of the leading edge of the signal (expressing the dominant code) which appears on the communication path 5 remains gradual, since that slope is determined by the clock master 3a. As a result as illustrated in FIG. 7, when the dominant code is transmitted by a standard node 3b, the separation between leading and trailing edges of the shaped signal TXr can be decreased while avoiding the problem of signal overlap, to a greater extent than is possible with the prior art. Specifically, while increasing the transmission data rate, it can be ensured that the leading edge of the shaped signal TXr completes a transition from the active to the inactive level before (or substantially close to) the timing at which the signal outputted from the clock master 3a begins to change from the dominant level to the recessive level.

Hence with the transceiver 20 of the above embodiment, generation of noise due to due to overlap between transmitted signals, or due to abrupt changes in signal level on the communication path 5, can be reliably prevented while increasing the rate at which data can be transmitted by the transceiver.

Other Embodiments

The present invention is not limited to the embodiment described above, and various modifications or alternative forms of the embodiment can be envisaged.

For example with the above embodiment, the proportion of duration at the dominant level is ⅓ in the case of the recessive code, and ⅔ in the case of the dominant code. However it would be equally possible to make these ratios ¼ for the recessive code, and ½ for the dominant code, etc.

With the above embodiment, the waveform shaping section 411 is configured to adjust the slope of each leading edge and trailing edge of the transmission data (i.e., of the shaped signal TXr). However it would be equally possible to employ respectively separate circuits for adjusting the leading edge slope and adjusting the trailing edge slope, i.e., the circuit which controls the slope of each leading edge would be designed to provide a higher level of drive current than the circuit which controls the slope of each trailing edge.

Furthermore with the above embodiment, the state of the enable signal EN (active or inactive) is fixedly set. However it would be equally possible to configure each transceiver 20 such that the state of the enable signal EN is determined by the signal processing section 10 of the transceiver.

What is claimed is:

1. A transceiver incorporated in a data communication system, coupled to a communication path of the system, whereby bits are serially transmitted over the communication path during respective bit intervals as a communication path signal comprising PWM (pulse width modulation) encoded signals respectively expressing a dominant code and a recessive code, each of the dominant code and recessive code comprising a transition from a recessive level to a dominant level at a bit boundary and a subsequent return to the recessive level within a bit interval after a specific corresponding duration has elapsed, the corresponding duration being longer for the dominant code than for the recessive code, the transceiver configured to transmit the dominant code by overwriting, with the dominant level, a part of a recessive-level portion of a recessive code that flows on the communication path;

the transceiver including receiver circuitry configured for receiving the communication path signal, encoding circuitry configured to generate a transmission signal and to respond to a request for transmitting data expressing a dominant code by changing the transmission signal from an inactive level to an active level at the timing of a boundary edge and subsequently returning the transmission signal to the inactive level after the corresponding duration of the dominant code has elapsed, the boundary edge comprising a transition of the communication path signal from the inactive level to the active level, waveform shaping circuitry configured for shaping respective edges of a waveform of the transmission signal with an edge slope, to obtain a shaped signal varying between the active level and the inactive level, and drive circuitry configured to hold the communication path signal at the dominant level while the shaped signal is at the active level thereof;

wherein the waveform shaping circuitry is configured to form the edge slope of the shaped signal to have a first degree of steepness at a transition from the inactive level to the active level and a second degree of steepness, less than the first degree, at a transition from the active level to the inactive level.

2. The transceiver as claimed in claim 1, wherein the waveform shaping circuitry comprises:

a delay section configured to delay the transmission signal by a predetermined amount, to obtain a delayed transmission signal;

a waveform shaping section configured to operate on the delayed transmission signal, for obtaining the shaped signal, and responsive to a drive current supplied thereto for making the degree of edge slope increasingly steep in accordance with increase of the drive current, and a current switching section configured to supply the drive current and to be responsive to the transmission signal produced from the encoding circuit for supplying the drive current to the waveform shaping section at a higher level when the transmission signal is at the active level than when the transmission signal is at the inactive level.

3. A data communication system, comprising:

a transceiver, coupled to a communication path of the system, whereby bits are serially transmitted over the communication path during respective bit intervals as a communication path signal comprising PWM (pulse width modulation) encoded signals respectively expressing a dominant code and a recessive code, each of the dominant code and recessive code comprising a transition from a recessive level to a dominant level at a bit boundary and a subsequent return to the recessive level within a bit interval after a specific corresponding duration has elapsed, the corresponding duration being longer for the dominant code than for the recessive code, the transceiver configured to transmit the dominant code by overwriting, with the dominant level, a part of a recessive-level portion of a recessive code that flows on the communication path;

the transceiver including receiver circuitry configured for receiving the communication path signal, encoding circuitry configured to generate a transmission signal and to respond to a request for transmitting data expressing a dominant code by changing the transmission signal from an inactive level to an active level at a timing of a boundary edge and subsequently returning the transmission signal to the inactive level after the corresponding duration of the dominant code has elapsed, the boundary edge comprising a transition of the communication path signal from the inactive level to the active level, waveform shaping circuitry configured for shaping respective edges of a waveform of the transmission signal with an edge slope, to obtain a shaped signal varying between the active level and the inactive level, and drive circuitry configured to hold the communication path signal at the dominant level while the shaped signal is at the active level thereof, wherein the waveform shaping circuitry is configured to form the edge slope of the shaped signal to have a first degree of steepness at a transition from the inactive level to the active level thereof and a second degree of steepness, less than the first degree, at a transition from the active level to the inactive level thereof; and, a second transceiver, configured to generate a second transmission signal, expressing transmission data comprising a continuous succession of recessive codes, and form the second transmission signal to a second shaped signal, each level transition of the second shaped signal having the second degree of steepness of edge slope, and supply the second shaped signal to a second drive circuit, coupled to the communication path.

\* \* \* \* \*